United States Patent [19]

Logan

[11] Patent Number: 5,401,903
[45] Date of Patent: Mar. 28, 1995

[54] ELECTRICAL OUTLET FINISHING PLATE

[75] Inventor: Richard Logan, Kingsville, Canada

[73] Assignee: Mid-America Building Products Corporation, Plymouth, Mich.

[21] Appl. No.: 30,582

[22] Filed: Mar. 12, 1993

[51] Int. Cl.⁶ .............................................. H02G 3/14
[52] U.S. Cl. .................................................... 174/66
[58] Field of Search .......................... 174/66; 220/241

[56] References Cited

U.S. PATENT DOCUMENTS

| | | | |
|---|---|---|---|
| 2,634,016 | 4/1953 | Hagen | 220/241 |
| 3,042,739 | 7/1962 | Craig | 174/66 |
| 4,635,168 | 1/1987 | Crowley | 562/147 |
| 4,726,152 | 2/1988 | Vagedes et al. | 52/28 |
| 4,920,708 | 5/1990 | MacLeod et al. | 52/60 |
| 5,144,099 | 9/1992 | Cardy | 174/66 |

FOREIGN PATENT DOCUMENTS

| | | | |
|---|---|---|---|
| 224716 | 3/1958 | Australia | 220/241 |
| 239720 | 6/1960 | Australia | 174/66 |

Primary Examiner—Leo P. Picard
Assistant Examiner—David Tone
Attorney, Agent, or Firm—Barnes, Kisselle, Raisch, Choate, Whittemore & Hulbert

[57] ABSTRACT

An electric outlet finishing plate is provided for use with a wall panel having raised portions and comprises a one-piece plastic body with front and rear walls. An internal wall connects the front and rear walls and an external peripheral wall depends from the front wall. The finishing plate is adapted to be inserted in an opening which has been cut in the raised section of the wall panel to provide access to an electrical outlet while giving a finished appearance thereto.

5 Claims, 2 Drawing Sheets

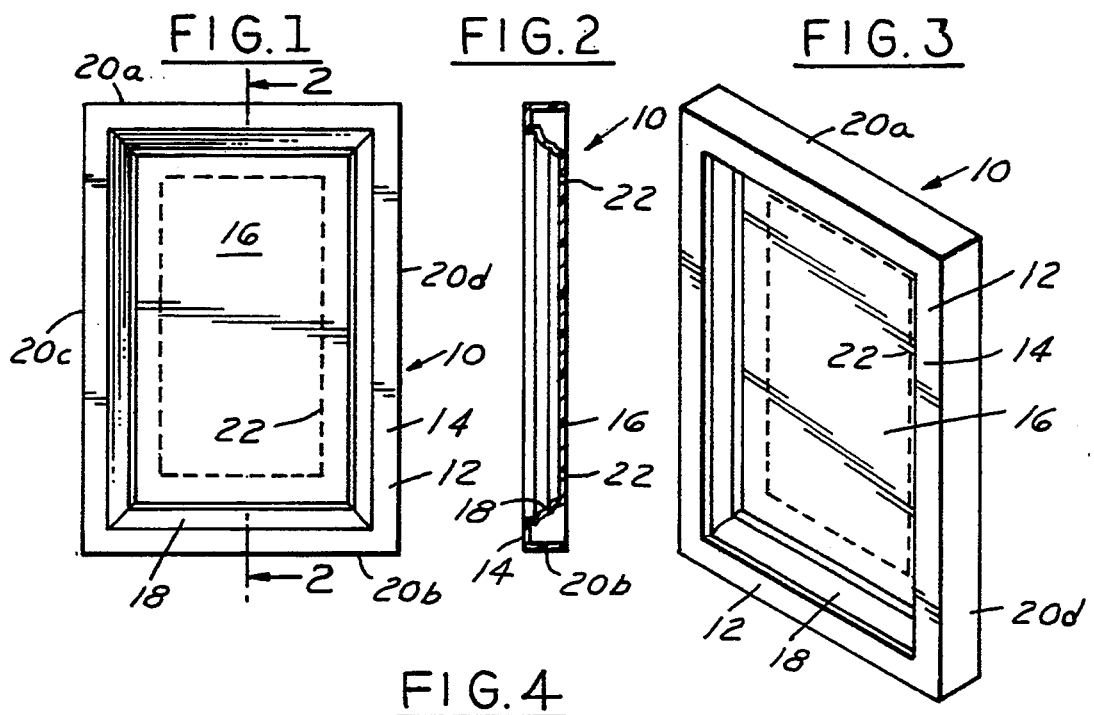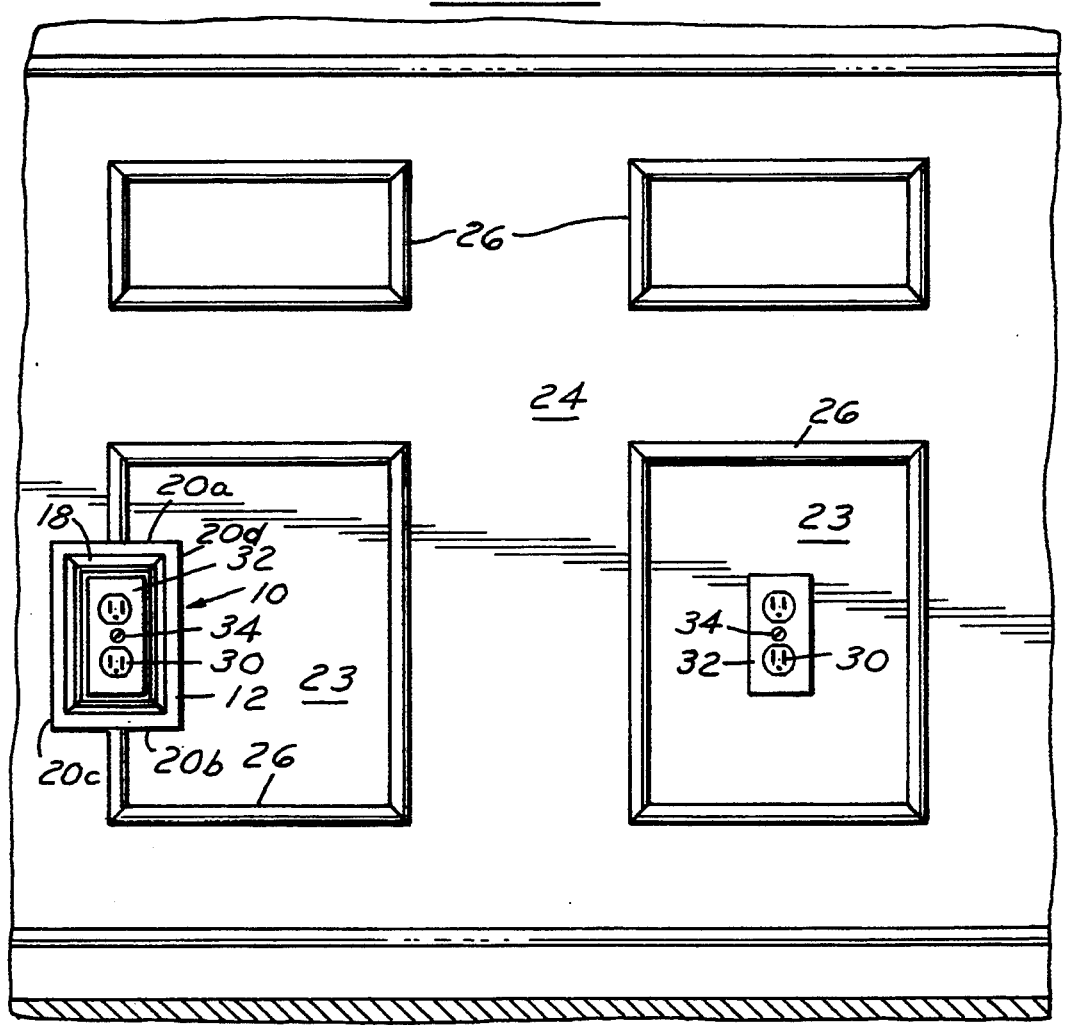

ELECTRICAL OUTLET FINISHING PLATE

This invention relates to a finishing plate for an electrical outlet. More particularly, this invention relates to a finishing plate to cover an electrical outlet located behind a raised portion of wainscoating, paneling or similar wall panel.

BACKGROUND OF THE INVENTION

In the building industry it may be desirable to finish inside walls of a building such as, for example, a house or mobile home, with wainscoating, paneling or similar building product made in accordance with U.S. patent application Ser. No. 07/912,876, filed Jul. 13, 1992, incorporated herein by reference. Such wall panels may have molded portions or sections that are raised from the wall to give the appearance of a raised panel section.

After the wall panel has been applied, it is generally necessary to cut the wall panel in order to gain access to an electrical outlet. If the wall panel lies substantially flat against the wall, a cover plate is typically attached to the electrical socket by screws giving a finished appearance. However, if the electrical outlet appears behind one of the raised sections of the wall panel, there is a gap or space between the raised portion and the wall giving a rough and unfinished appearance.

It has been proposed in U.S. Pat. Nos. 4,635,168; 4,726,152 and 4,920,708 to provide mounting assemblies to accommodate light fixtures and the like and to give a finished appearance to the outside siding of a house. However, such mounting assemblies are not adapted to give a finished appearance to an electrical outlet or an inside wall panel having raised portions or sections.

The present invention provides a finishing plate which gives a finished appearance to a wall panel that has been cut to gain access to an electrical outlet; which is attractive; which is easy to manufacture; which is economical and which is easy to install.

The device of the present invention is adapted for use with the inside wall panel of a house or mobile home.

SUMMARY OF THE INVENTION

In accordance with the present invention, an electrical outlet finishing plate is provided to give a finished look to a wall panel which has been cut to provide access to an electrical outlet.

More specifically, the electrical outlet finishing plate comprises a one-piece plastic body having a front wall, a substantially planar rear wall spaced from the front wall, an internal wall connecting the front and rear walls and an external peripheral wall depending from the front wall such that when the body is inserted into an opening in the wall panel, the front wall is substantially flush with the outer surface of the raised portion of the wall panel.

DESCRIPTION OF THE DRAWINGS

FIG. 1 is a front view of the finishing plate in accordance with the present invention;

FIG. 2 is a sectional view through line 2—2 of FIG. 1;

FIG. 3 is a perspective view of the finishing plate;

FIG. 4 is a front view of the wall panel with the finishing plate installed;

DESCRIPTION

Figure 5:
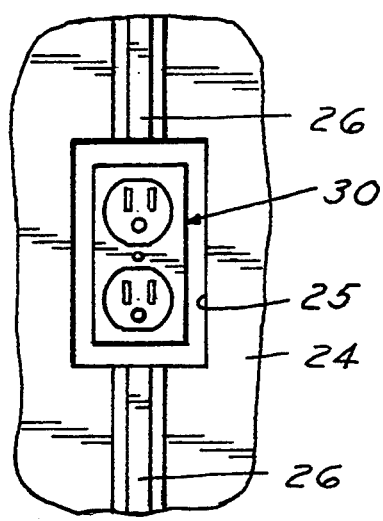
FIG. 5 is a partial view of the first step of preparing the wall panel.

Referring now to FIGS. 1-3, it can be seen that the finishing plate 10 comprises a one-piece plastic body 12 that is preferably injection molded having a front wall 14 and a rear wall 16 that are non-coplanar with each other. The front wall 14 and rear wall 16 are connected by an inwardly spaced internal wall 18. An external peripheral wall shown as outer walls 20a, 20b, 20c, 20d depend from the front wall 14 extending substantially perpendicular thereto. The rear wall 16 includes indicia in the form of a groove 22 that defines a score line along which the rear wall 16 may be cut and thereby define an opening for accommodating a standard electrical outlet.

Figure 8:
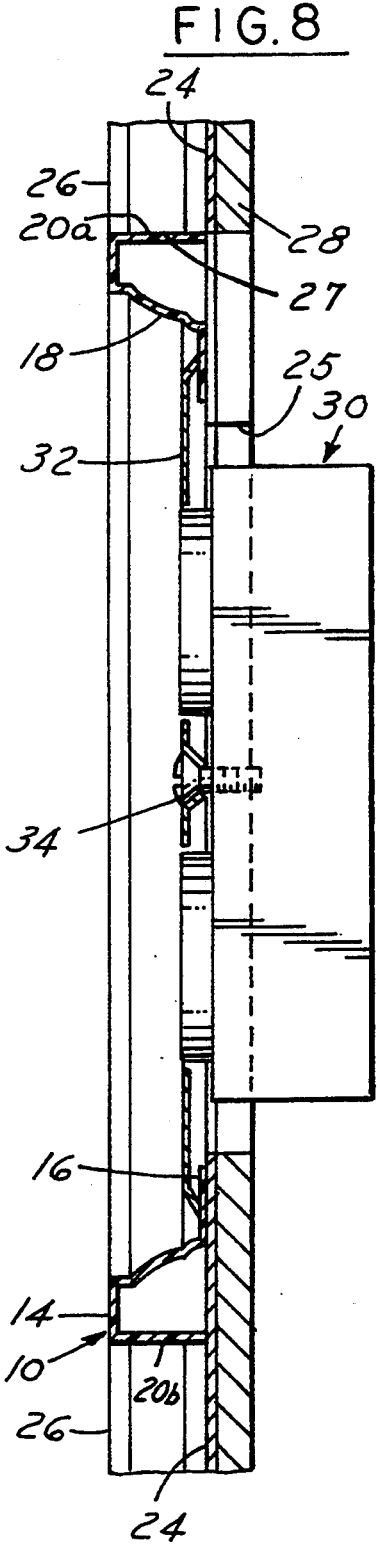
FIG. 8 is a sectional view through line 8—8 of FIG. 7.

Referring now to FIGS. 4, 5 and 8, it can be seen that the plastic wall panel 24 has a uniform thickness and may have raised sections 26 giving the appearance of a raised panel effect. If an electrical outlet 30 is located behind a flat portion 23 of the wall panel 24, a portion of the panel in the flat portion 23 is cut and removed to define an opening to gain access to the electrical outlet 30 and a standard electrical cover plate 32 is mounted thereto in a typical fashion such as by a screw 34.

However, if an electrical outlet is located behind the raised section 26, a portion of the panel must be cut through the raised section 26 and removed to define an opening for access to the outlet. Since the raised section 26 is spaced from the wall 28, what remains from the opening is a gap or space between the raised portion 26 and the wall giving a rough and unfinished appearance.

Figure 6:
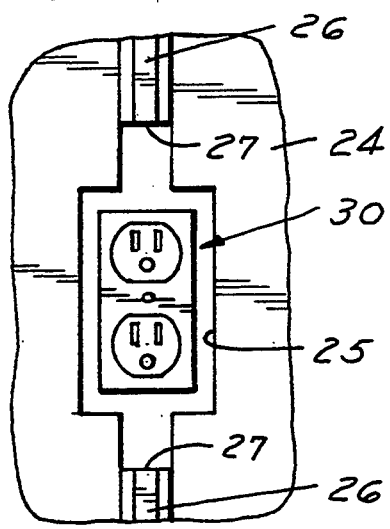
FIG. 6 is a partial view of the next step of preparing the wall panel.
Figure 7:
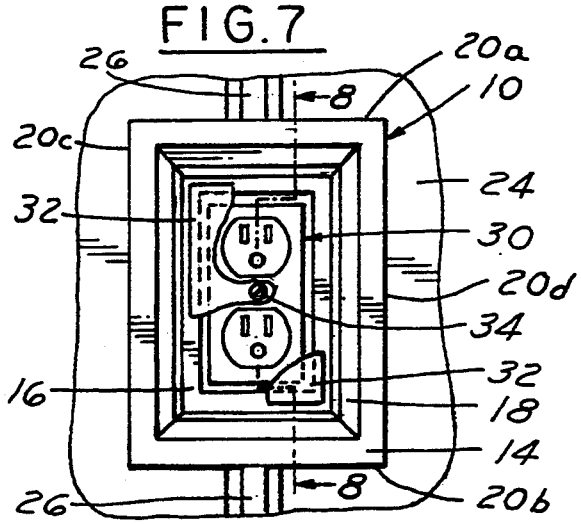
FIG. 7 is a partial view of the installed finishing plate with the electrical cover plate.

In accordance with the invention, an opening 25 is made in the wall panel 24 by cutting through the raised section 26. The size of the opening is sufficient for access to the electrical outlet 30 (FIG. 5). A portion of the raised section 26 above and below opening 25 is further cut (FIG. 6) leaving a gap between the cut ends 27 substantially the size of the height of the finishing plate 10. The finishing plate 10 is then inserted therein so that the external peripheral wall, for example, walls 20a, 20b, abut the cut ends 27 of the raised section 26. The rear wall 16 and the free ends of the external peripheral wall such as the outer walls 20a, 20b, 20c, 20d lie substantially flat against the wall panel 24 and the front wall 14 is substantially flush with the raised section 26 of the wall panel 24. The finishing plate 10 is preferably molded to substantially have the configuration of the raised section 26 so that when in place, the finishing plate 10 blends into the wall panel 24 giving the appearance that the raised section 26 is continuous and surrounds the electrical outlet 30.

Before inserting the finishing plate 10 into the opening 25 in the wall panel 24, the rear wall 16 is cut along the groove 22 to accommodate the electrical outlet 30. After insertion into the opening 25, a standard electrical cover plate 32 is then mounted on the electrical outlet 30 in a typical manner as by a screw 34 resulting in a finished appearance of the wall panel 24.

Thus, the finishing plate of the present invention provides a finished appearance to the wall panel that has been cut to provide access to an electrical outlet.

I claim:

1. An electrical outlet finishing plate for use with a wall panel having at least one raised portion applied to an inside building wall comprising
   a one-piece plastic body having a front wall with an inner periphery and an outer periphery,
   an integral rear wall spaced from said front wall and having a plane,
   means on said rear wall to accommodate an electrical outlet,
   indicia on said rear wall such that the rear wall may be cut along said indicia to provide an opening for the electrical outlet,
   an integral internal wall extending from the inner periphery of said front wall to said rear wall, and
   an integral external peripheral wall extending from the outer periphery of said front wall toward said rear wall,
   said external peripheral wall having a flat external surface which lies perpendicular to said plane of the rear wall, and free ends extending to the plane of said rear wall such that when the finishing plate is used with a wall panel having raised sections applied to an inside building wall with an opening cut from the wall panel through a raised section for access to an electrical outlet, the body is inserted within the opening so that said external peripheral wall abuts the building wall and said front wall is substantially flush with the raised portion of the wall panel.

2. The finishing plate set forth in claim 1 wherein said internal wall is slanted inwardly.

3. The finishing plate set forth in claim 1 wherein said body is injection molded.

4. In a method of utilizing a molded plastic wall panel on an existing inside building wall where the wall panel has integral raised portions and is applied to the building wall with a raised portion overlying an electrical outlet or the like, the method comprising the steps of
   cutting and removing a portion of the wall panel through a raised portion to provide access to an electrical outlet,
   providing a one-piece plastic body having a front wall with an inner and outer periphery, a rear wall spaced from the front wall, an internal wall extending from the inner periphery of the front wall to the rear wall, an external wall extending from the outer periphery of the front wall toward the rear wall, and indicia on the rear wall such the rear wall may be cut along the indicia to provide access to the electrical outlet,
   cutting the rear wall along the indicia to conform to the electrical outlet,
   cutting and removing the raised portion adjacent the electrical outlet to form an opening in the wall panel to accommodate said plastic body, and
   positioning said plastic body in the wall panel at the opening therein such that a finished appearance is provided to the wall panel.

5. The method set forth in claim 4 including
   providing indicia on said rear wall of said finishing plate along which said rear wall is cut to form the opening for the electrical outlet.

* * * * *